United States Patent [19]
Chou et al.

[11] Patent Number: 5,972,193
[45] Date of Patent: Oct. 26, 1999

[54] METHOD OF MANUFACTURING A PLANAR COIL USING A TRANSPARENCY SUBSTRATE

[75] Inventors: Min-Chieh Chou, Taipei; Ching-Yi Wu; Star Rey-Shing Huang, both of Hsinchu; Yuh-Sheng Lin, Hsin Tien, all of Taiwan

[73] Assignee: Industrial Technology Research Institute, Hsinchu, Taiwan

[21] Appl. No.: 08/949,001

[22] Filed: Oct. 10, 1997

[51] Int. Cl.⁶ .................................................. C25D 5/02
[52] U.S. Cl. .................................................. 205/122
[58] Field of Search .................................. 205/122, 123, 205/125, 129, 157

[56] References Cited

U.S. PATENT DOCUMENTS

| | | | |
|---|---|---|---|
| 4,022,928 | 5/1977 | Piwcyzk | 427/43 |
| 4,721,550 | 1/1988 | Schumacher, III | 204/15 |
| 5,200,056 | 4/1993 | Cohen et al. | 205/122 |
| 5,327,033 | 7/1994 | Guckel et al. | 310/40 |
| 5,356,526 | 10/1994 | Frankenthal et al. | 205/122 |
| 5,516,418 | 5/1996 | Doss et al. | 205/119 |
| 5,545,307 | 8/1996 | Doss et al. | 205/122 |
| 5,547,557 | 8/1996 | Aisa et al. | 205/118 |
| 5,549,808 | 8/1996 | Farooq et al. | 205/123 |
| 5,580,687 | 12/1996 | Leedy | 430/5 |
| 5,646,464 | 7/1997 | Sickafus | 310/40 MM |

*Primary Examiner*—Kathryn Gorgos
*Assistant Examiner*—Erica Smith-Hicks
*Attorney, Agent, or Firm*—W. Wayne Liauh

[57] ABSTRACT

The present invention uses a glass to act as a substrate. A stencil layer is patterned on the top surface of the substrate. Successively, a copper layer is deposited over the substrate. Next step is to remove the stencil layer. A negative photoresist layer is formed on the copper layer. A negative photoresist layer is processed using a backside exposure of the resist through the transparent substrate. The backside exposure technique uses the self-aligning, conductive copper layer as a mask. A plurality of trenches are then created in the photoresist layer and a second copper layer is electroplated in the trenches to form the planar coils.

15 Claims, 4 Drawing Sheets

METHOD OF MANUFACTURING A PLANAR COIL USING A TRANSPARENCY SUBSTRATE

FIELD OF THE INVENTION

The present invention relates to a planar coil, and more specifically, to a method of making a planar coil by using a transparent substrate for micromachining.

BACKGROUND OF THE INVENTION

Great progress has been made in the combination of micromachining and Integrated Circuit (IC) technology. Various of microelectromechanical system (MEMS) require microactuators for generating large driving force. Up to now, an electromagnetic actuator, base on electromagnetic principle, is attractive because it needs only simple fabrication process. A motor is a typical example for the electronmagnetic actuator. Generally speaking, it consists of a magnet and coils that can be made by IC planer process.

Planar coils are needed in many applications of microelectromechanical system. One example in the field of medicine is a microsystem for measuring the blood pressure inside the human body. Further, the planar coils can also be used in the generation of electromagnetic forces together with permanent magnets or permeable cores as an adjusting or driving force for micro pumps, micro valves, micro relays or other devices. Therefore, the formation of planar coils plays an important role in the making of microactuators.

One of the prior arts for fabricating the coils is described accompany with related drawings as follows (See "A NEW FABRICATION PROCESS OF A PLANAR COIL USING PHOTOSENSITIVE POLYIMIDE AND ELECTROPLATING", Y. Watanabe; The Bin International Conference on Solid State Sensors and Actuators and Eurosensors IX Stocknolm. Sweden, Jun. 25–29, 1995). Turning to FIG. 1, a ZnCu alloy substrate 2 is provided. Polyimide layer 4a, 4b are respectively coated on both sides of the substrate 2. Platinum particles 6 are formed on the surface of the top polyimide layer 4a to act as nuclei for the electroless plating. Turning to FIG. 2, a photosensitive polyimide layer 8 is then patterned on the platinum particles 6 using lithography technology. The polyimide layer 8 is cured after exposure and development process. The curing is accomplished by two steps at temperatures 140 and 350° C., respectively.

As shown in FIG. 3, the substrate 2 is immersed in an alkaline copper solution of 40° C. to obtain a 200 angstroms thick conductive layer 10. As shown in FIG. 4, a copper layer 12 is subsequently electroplated using copper borofluoride acid (CBA). Next, turning to FIG. 5, a polyimide layer 14 is coated on the polyimide layer 8 and the copper layer 12 for isolation. Then, a contact hole 16 is generated in the polyimide layer 14 using photolithography and etching processes. However, high manufacturing costs are associated with this prior art method.

SUMMARY OF THE INVENTION

A transparent material is used to act as a substrate for the present invention. A stencil layer is patterned on the top surface of the substrate having thickness over 5000 angstroms. A titanium layer is formed on the substrate and the stencil layer for reducing the stress between the substrate and subsequent layer. Further, the titanium layer can improve the adhesion between the substrate and the subsequent conductive layer. Successively, a conductive layer is deposited on the titanium layer to serve as coils for the present invention. Typically, the conductive layer is selected from the group of copper, aluminum, gold, tungsten or alloy. In a preferred embodiment, copper is used to serve as the conductive layer. In a preferred embodiment, the thickness of the copper layer is greater than the thickness of the stencil layer.

The next step of the formation is to strip the stencil layer. A negative photoresist layer or a photosensitive polyimide layer is formed on the Ti/Cu composition layer. Preferably, it has a thickness greater than 10000 angstroms. The negative photoresist layer is then exposed by light from the bottom surface of the substrate. Portions of the negative photoresist layer will not be exposed by the light due to the Ti/Cu layer formed under the portions of negative photoresist layer. The negative photoresist layer that is exposed by the light will remain on the substrate after a subsequent development. Therefore, a plurality of trenches are created in the negative photoresist layer. A copper layer is formed in the trenches by electroplating for using as the planar coils.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention relates to a method of making a planar coil for a micromechine, which will reduce the cost of formation and the fabrication is simple. Lithography process is widely used in the present invention. It is one of the most important processes in the IC fabrication. That is because the formation of the integrated circuits require that precisely controlled the sizes of various IC elements. Typically, the photoresist is applied as a thin film to a wafer or an underlying layer, and then exposed through a mask in step-and repeat projection system. The mask contains clear and opaque features that define the pattern to be created in the photoresist layer. Following development, a portion of the underlying layer is removed by etching, thereby transfering the mask pattern in that underlying layer.

In addition, a negative layer is used in the present invention. Particularly, a transparent material will be used to serve as a substrate for this method. As will be seen below, these techniques can be used to create planar coils using transparent substrate. The detail processes will be described as follows.

Figure 1:
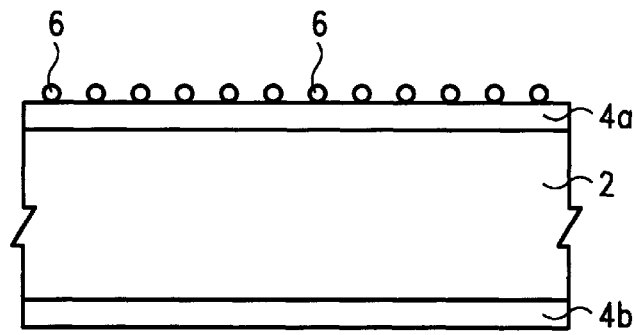
FIG. 1 is a cross section view of a substrate illustrating the step of forming Pt particles on the substrate in accordance with the prior art.
Figure 2:
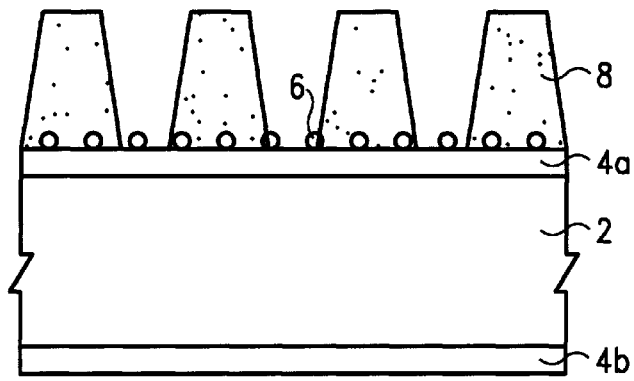
FIG. 2 is a cross section view of a substrate illustrating the step of forming a polyimide layer over the substrate in accordance with the prior art.
Figure 3:
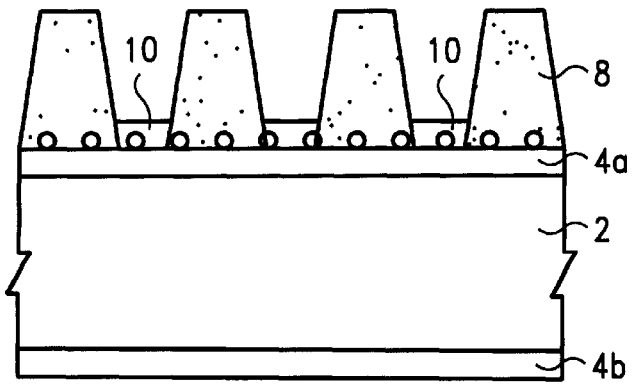
FIG. 3 is a cross section view of a substrate illustrating the step of forming a first copper layer over the substrate in accordance with the prior art.
Figure 4:
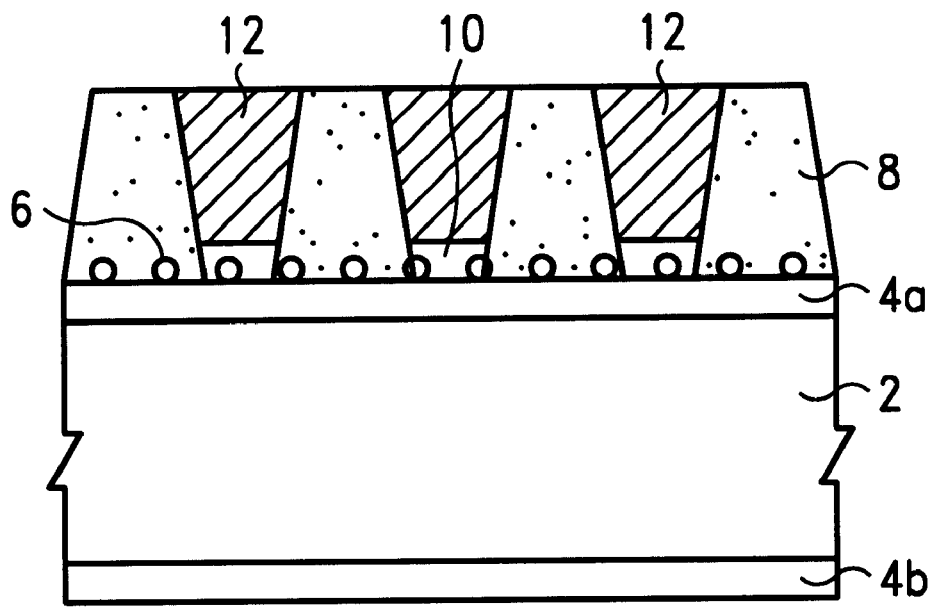
FIG. 4 is a cross section view of a semiconductor substrate illustrating the step of forming a second copper layer over the substrate in accordance with the prior art.
Figure 5:
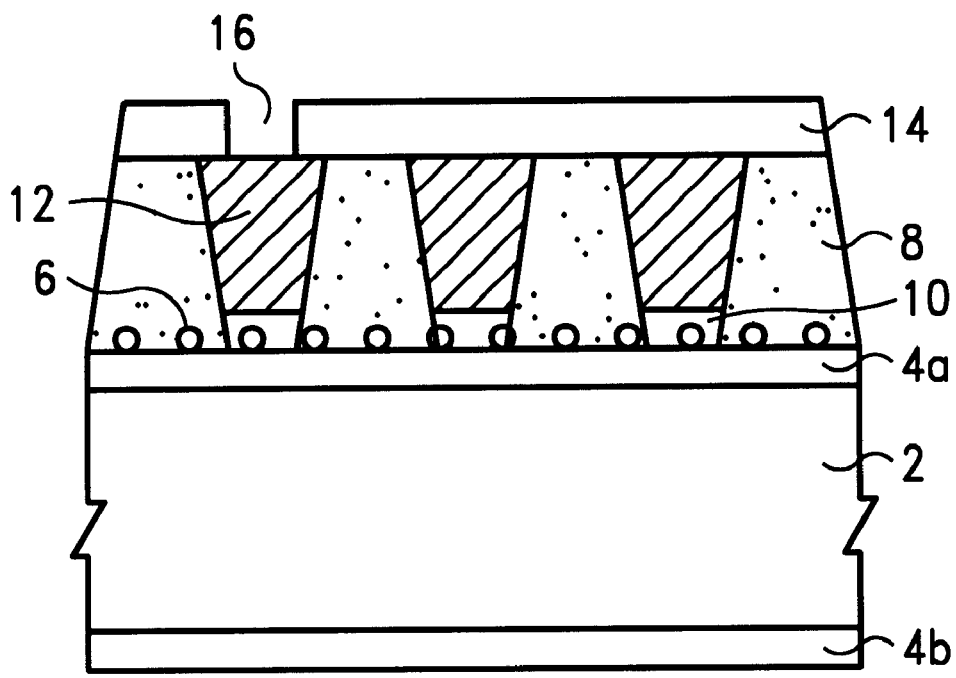
FIG. 5 is a cross section view of a semiconductor substrate illustrating the step of forming polyimide layer and forming a contact hole in the polyimide layer in accordance with the prior art.
Figure 6:
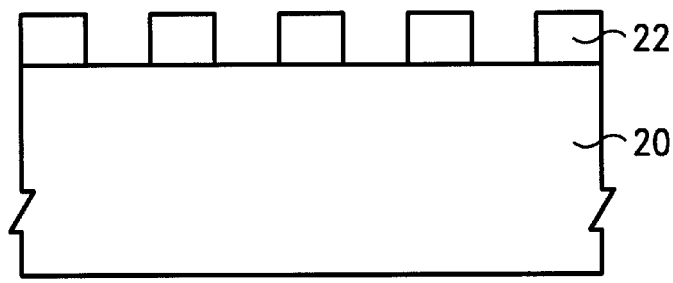
FIG. 6 is a cross section view of a substrate illustrating the step of patterning a stencil layer on the substrate in accordance with the present invention.

Referring to FIG. 6, a transparency material, such as glass, quartz, alumino silicate, [White Lromn or Pyrex] soda lime, or boro-silicate is used to act as a substrate 20 for the present invention. In a preferred embodiment, PYREX™, boro-silicate glass manufactured by Corning Glass Works of New York is used as the substrate 20. The thickness of the substrate 20 is about 0.1 mm. A stencil layer 22 is patterned on the top surface (first surface) of the substrate 20 having a thickness over 5000 angstroms to expose portions of the substrate 20. Generally speaking, the photoresist pattern 22 is created via photolithography step to remove portions of the photoresist that is exposed by the light using a mask. The stencil layer 22 is selected from the group of photoresist, aluminum, silicon dioxide or polymide.

Figure 7:
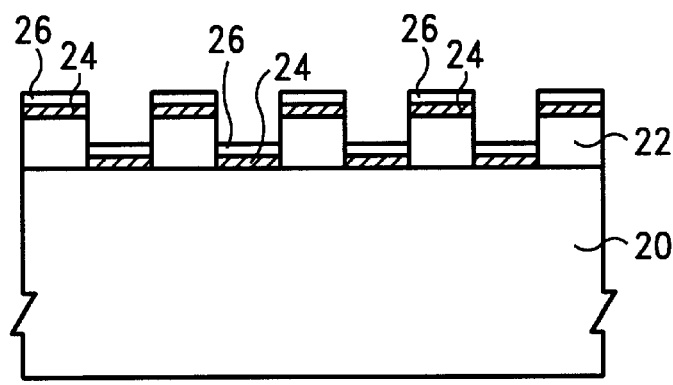
FIG. 7 is a cross section view of a substrate illustrating the step of forming a titanium layer and a first copper layer on the stencil layer in accordance with the present invention.

Referring to FIG. 7, after the stencil layer 22 is patterned, a barrier layer 24 is formed on the substrate 20 and the stencil layer 22 for reducing the stress between the substrate 20 and subsequent conductive layer. Further, the barrier layer 24 can improve the adhesion between the substrate and the subsequent conductive layer. The barrier layer 24 is composed of titanium, nickel or chromium. Preferably, the thickness of the barrier layer is less than 1000 angstroms and is deposited using physical vapor deposition. Successively, a conductive layer 26 is deposited on the barrier layer 24 to serve as planar coils for the present invention. Typically, the conductive layer 26 is selected from the group of copper, aluminum, silver, nickel, gold, tungsten or alloy. In a preferred embodiment, copper is used to serve as the conductive layer 26 and formed using physical vapor deposition. The thickness of the conductive layer 26 is less thiner than the thickness of the stencil layer 22. In a preferred embodiment, the copper layer 26 is formed to have a thickness about 1000 angstroms. It is appricated that any suitable method can be used for forming the conductive layer 26. It can provide conformal coverage of the substrate 20.

Figure 8:
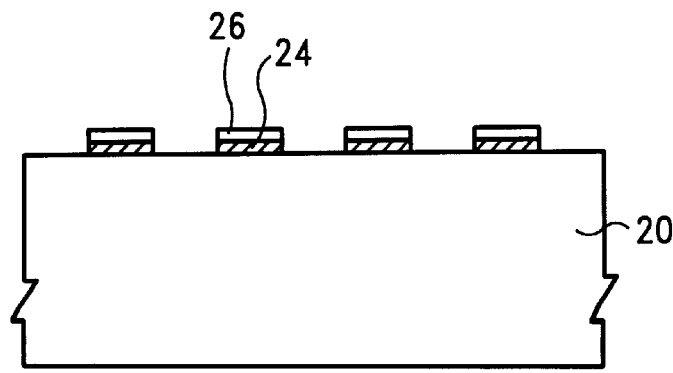
FIG. 8 is a cross section view of a substrate illustrating the step of removing the stencil layer in accordance with the present invention.

Turning to FIG. 8, the next step of the formation is to strip the stencil layer 22. Apparently, the barrier layer 24 and the conductive layer 26 that are formed on the stencil layer 22 are also removed, simultaneously. A Ti/Cu composition layer 24, 26 is left on the substrate 20, which serves as the planar coils for the present invention.

Figure 9:
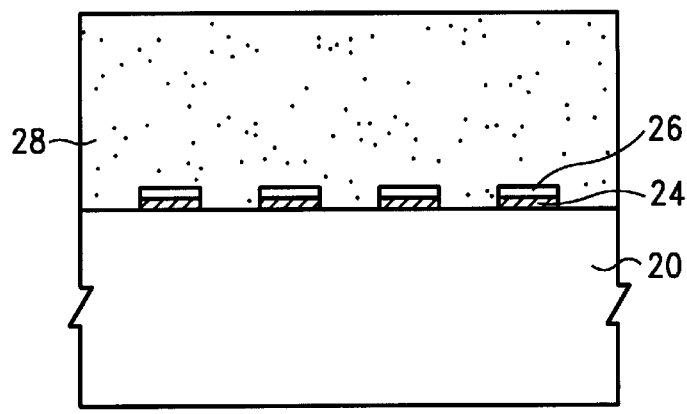
FIG. 9 is a cross section view of a substrate illustrating the step of forming a negative photoresist layer on the copper layer and on the substrate in accordance with the present invention.

Referring to FIG. 9, a negative photoresist layer 28 or a photosensitive polyimide layer 28 is formed on the Ti/Cu composition layer 24, 26 and the substrate 20 to a thickness greater than 10000 angstroms.

Figure 10:
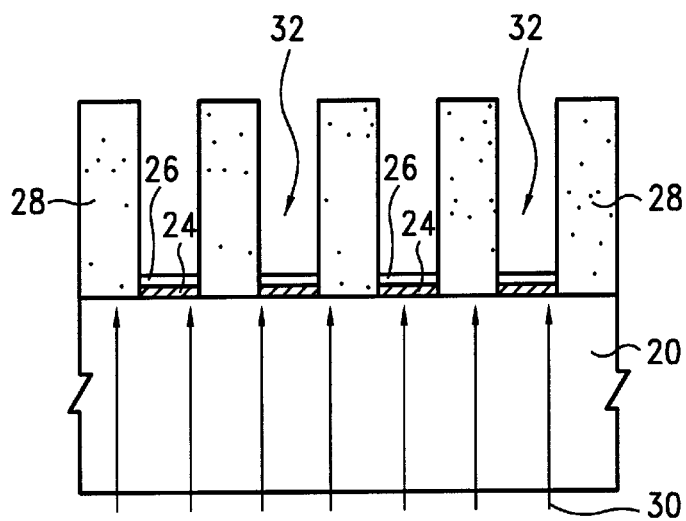
FIG. 10 is a cross section view of a substrate illustrating the step of forming the negative photoresist layer by exposure from the bottom of the substrate, then the trenches is formed after development in accordance with the present invention.

As shown in FIG. 10, the negative photoresist layer 28 or the photosensitive polyimide layer 28 is then exposed by UV light, indicated by arrows 30, from the bottom surface (second surface) of the substrate 20. Namely, the light exposes the negative photoresist layer 28 through the transparency substrate 20. Portions of the negative photoresist layer 28 will not be exposed by the light due to the Ti/Cu layer 24, 26 is formed under the portions of negative photoresist layer 28. The negative photoresist layer 28 or the photosensitive polyimide layer 28 that is exposed by the light will remain on the substrate 20 after a subsequent development. Therefore, a plurality of trenches 32 are created in the negative photoresist layer 28 (or photosensitive polyimide layer 28) and the Ti/Cu layer 24, 26 is self-aligned formed in the trench 32. The remaining negative photoresist layer 28 (or photosensitive polyimide layer 28) acts as an isolation between coils.

Figure 11:
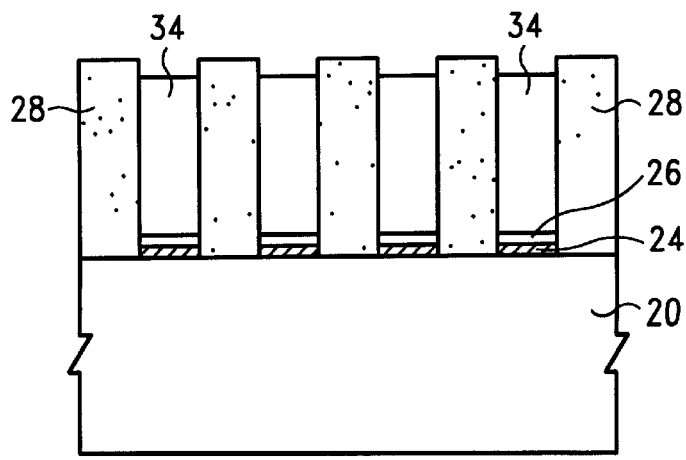
FIG. 11 is a cross section view of a substrate illustrating the step of forming a second copper layer on the first copper layer in accordance with the present invention.

As shown in FIG. 11, a conductive layer 34 is formed in the trenches 32 by electroplating for using as the coils. The conductive layer is selected from the group of copper, silver, gold, or nickel. Preferably, the conductive layer 34 is composed of copper. Typically, the electroplating needs external power source. The plating rate and the grain size can be controlled exactly. Alternatively, the copper layer 34 can be electroplated from a $CuSO_4/H_2SO_4$ bath at room temperature. Electroplating allows for controlled thickness for the copper layer.

The present invention uses a transparency material as the substrate 20. An exposure is performed to expose the negative photoresist from the bottom of the substrate 20 by using the layers 24, 26 as a mask, which can save a photomask for the exposure.

As is understood by a person skilled in the art, the foregoing preferred embodiment of the present invention is illustrative of the invention herein disclosed, and not limitative of its scope. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes can be made therein without departing from the spirit and scope of the invention.

What is claimed is:

1. A method for manufacturing a planar coil on a transparency substrate for a micromachine, said transparency substrate having a first surface and a second surface, said method comprising the steps of:

forming a stencil layer on said first surface of said transparency substrate;

patterning said stencil layer using lithography;

forming a first conductive layer on said stencil layer and on said first surface of said transparency substrate to serve as said planar coils;

removing said first stencil layer, portions of said first conductive layer remaining on said first surface of said transparency substrate;

forming a photosensitive layer on said first conductive layer and on said first surface of said transparency substrate;

exposing said photosensitive layer from said second surface of said transparency substrate;

developing said photosensitive layer, said exposed portions of said photosensitive layer remaining on said first surface of said transparency substrate, thereby forming trenches between said exposed portions of said photosensitive layer, said first conductive layer being in said trenches; and forming a second conductive layer in said trenches and on said first conductive layer to serve as said planar coils.

2. The method of claim 1, further comprises forming a barrier layer on said first surface of said transparency substrate before forming said first conductive layer.

3. The method of claim 1, wherein said transparency substrate is selected from the group consisting of quartz, glass, almino silicate and boro-silicate.

4. The method of claim 1, wherein said stencil layer is selected from the group consisting of photoresist, aluminum, silicon dioxide and polyimide.

5. The method of claim 4, wherein said stencil layer has a thickness greater than 5000 angstroms.

6. The method of claim 1, wherein said first conductive layer is selected from the group consisting of copper, silver, nickel and gold.

7. The method of claim 6, wherein said first conductive layer has a thickness thinner than the thickness of said stencil layer.

8. The method of claim 7, wherein said first conductive layer is formed by using physical vapor deposition.

9. The method of claim 1, wherein said photosensitive layer is selected from the group consisting of negative photoresist and photosensitive polyimide.

10. The method of claim 9, wherein said photosensitive layer has a thickness greater than 10000 angstroms.

11. The method of claim 2, wherein said barrier layer is selected from the group consisting of titanium, nickel and chromium.

12. The method of claim 11, wherein said barrier layer has a thickness thinner than 1000 angstroms.

13. The method of claim 11, wherein said barrier layer is formed by physical vapor deposition.

14. The method of claim 1, wherein said second conductive layer is selected from the group consisting of copper, silver, gold and nickel.

15. The method of claim 14, wherein said second conductive layer is formed by electroplating.

* * * * *